3,127,435
S-(1,2-DIHALOALKENYL) O,O-DIALKYL
PHOSPHORODITHIOATES AND METHOD
FOR THEIR PREPARATION
Bernard Miller, Princeton, N.J., assignor to American
Cyanamid Company, Stamford, Conn., a corporation
of Maine
No Drawing. Filed Oct. 16, 1962, Ser. No. 231,019
6 Claims. (Cl. 260—461)

The present invention relates to novel halogenated phosphorodithioates and methods for their preparation. More specifically, the invention relates to S-dihalo aliphatic phosphorodithioates represented by the general formula:

[I] 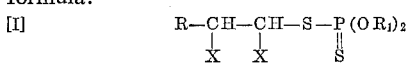

or

[II] 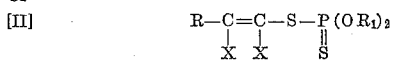

wherein X is a halogen atom, R stands for hydrogen, lower alkyl and aryl, and $R_1$ is a lower alkyl radical.

The halogenated phosphorodithioates of the present invention find utility as pesticides, particularly as insecticides and miticides.

As is known, phosphorodithioates are readily affected by oxidizing agents whereby the P=S linkage is converted to a P=O linkage. It has been unexpectedly found, however, that the halogenation of certain phosphorodithioates does not result in oxidized derivatives. Accordingly, the novel phosphorodithioate compounds of the present invention can be prepared by subjecting either an S-vinyl phosphorodithioate or an S-acetylenic phosphorodithioate, hereinbelow defined with particularity, to the action of chlorine or bromine whereby the unsaturated substituent of the phosphorodithioates is solely affected.

Halogenation is advantageously carried out at temperatures from about minus (—) 70° C. to about 20° C., and preferably between about minus (—) 30° C and 0° C. The halogenating agents, chlorine and bromine, may either be fed as vapors through the liquid phosphorodithioates or introduced as their solutions by dissolving the agents in a suitable solvent, such as for instance chloroform, carbon tetrachloride or methylene chloride.

The known phosphorodithioates which can be employed in the instant invention are, for instance:

O,O-diethyl S-(β-styryl) phosphorodithioate,
O,O-dimethyl S-(β-styryl) phosphorodithioate,
O,O-dimethyl S-vinyl phosphorodithioate,
O,O-diethyl S-vinyl phosphorodithioate,
O,O-diethyl S-1-butenyl phosphorodithioate,
O,O-diethyl S-naphthylvinyl phosphorodithioate,
O,O-diethyl S-isopropenyl phosphorodithioate,
O,O-dimethyl S-n-propenyl phosphorodithioate,
O,O-diethyl S-phenylethynyl phosphorodithioate,
O,O-diethyl S-methylethynyl phosphorodithioate,
O,O-dimethyl S-phenylethynyl phosphorodithioate,
O,O-diethyl S-naphthylethynyl phosphorodithioate,
O,O-diethyl S-isopropylethynyl phosphorodithioate,
O,O-dimethyl S-n-propylethynyl phosphorodithioate,
O,O-diethyl S-n-butylethynyl phosphorodithioate,
O,O-diethyl S-tetra.-butylethynyl phosphorodithioate,
O,O-dibutyl S-1-propynyl phosphorodithioate, homologs and isomers of the same.

In order to facilitate a further understanding of the invention, the following examples are presented primarily for the purpose of further illustrating certain more specific details thereof. The scope of the invention is not to be deemed limited thereby except as defined in the claims. Unless otherwise stated, the parts are by weight.

EXAMPLE 1

*Preparation of O,O-Diethyl S-(1,2-Dibromo)-1-Propenyl Phosphorodithioate*

To four parts of O,O-diethyl S-1-propynyl phosphorodithioate dissolved in 25 parts by weight of reagent grade chloroform are added 2.86 parts of bromine in 15 parts by volume of chloroform over a one-half hour period. The solvent is then evaporated and 6.70 parts of a red liquid are recovered. The latter is chromatographed on neutral alumina whereby 3.71 parts of a light yellow liquid, representing a yield of about 54 percent having a refractive index ($n_D^{25}$) equal to 1.5618 is recovered. On infrared spectrum analysis, no C≡C or P=O bonds are observed, but a double bond peak at 6.40μ is noted indicating that the compound O,O-diethyl S-(1,2-dibromo)-1-propenyl phosphorodithioate is prepared.

Substituting O,O-diethyl S-phenylethynyl phosphorodithioate for O,O-diethyl S-1-propynyl phosphorodithioate reactant above, a good yield of O,O-diethyl S-(1,2-dibromo)-1-phenylethenyl phosphorodithioate is obtained.

EXAMPLE 2

*Preparation of O,O-Diethyl S-(1,2-Dichloro)-1-Propenyl Phosphorodithioate*

Chlorine gas is condensed in a Dry Ice-acetone bath until 0.405 part (by volume) is collected in a suitable receiver. The latter is slowly warmed and vapors of chlorine are passed into a solution comprising 2 parts of O,O-diethyl S-1-propynyl phosphorodithioate in 20 parts by volume of carbon tetrachloride while maintaining the reaction mixture at minus (—) 20° C. When all the chlorine is added, the reaction mixture is warmed up to room temperature and evaporated to yield 2.09 parts of a dark liquid. The dark liquid is next subjected to chromatography on alumina. A yellow liquid representing a yield of about 29 percent based on the theoretical is obtained. This liquid darkens quickly on standing. Upon infrared spectrum analysis, the presence of C=C is noted to the exclusion of C≡C or P=O bonds. Thus, the compound, O,O-diethyl S-(1,2-dichloro)-1-propenyl phosphorodithioate, is prepared.

EXAMPLE 3

*Preparation of O,O-Dimethyl S-1,2-Dibromoethyl Phosphorodithioate*

To 1.31 parts of O,O-dimethyl S-vinyl phosphorodithioate in 25 parts of carbon tetrachloride are added 1.14 parts of bromine dissolved in 10 parts of carbon tetrachloride. After standing for one hour, the solvent is evaporated to yield 2.46 parts of a red liquid product. Infrared spectrum analysis indicates the absence of C=C or P=O bonds. Subjecting resultant red liquid to chromatography on neutral alumina, 2.24 parts of a yellow liquid having a refractive index ($n_D^{25}$) equal to 1.5895 are obtained. The infrared spectrum is identical with that of the crude product indicating that the compound obtained can be represented by the formula:

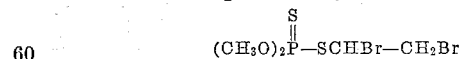

On further analysis, the following data in percent are obtained: Calculated for $PS_2O_2Br_2C_4H_9$: Br, 46.4; S, 18.6. Found: Br, 45.1; S, 19.95.

Substituting O,O-dimethyl S-β-styryl phosphorodithioate for the O,O-dimethyl S-vinyl phosphorodithioate reactant above, a good yield of O,O-dimethyl S-(1,2-dibromo)-1-phenylethyl phosphorodithioate is recovered.

EXAMPLE 4

*Preparation of O,O-Dimethyl S-1,2-Dichloroethyl Phosphorodithioate*

Repeating the procedure of Example 3 in every detail, except that chlorine is substituted for bromine, there is obtained a good yield of O,O-dimethyl S-1,2-dichloroethyl phosphorodithioate.

EXAMPLE 5

*Preparation of O,O-Diisopropyl S-1,2-Dibromoethyl Phosphorodithioate*

Example 3 is repeated in every detail except that O,O-diisopropyl S-vinyl phosphorodithioate is employed in lieu of the phosphorodithioate of that example. A good yield of O,O-diisopropyl S-1,2-dibromoethyl phosphorodithioate is obtained.

The compounds of the present invention are highly effective insecticides and miticides. To demonstrate the marked degree of such pesticidal activity, representative compounds are subjected to tests outlined in the examples below.

EXAMPLE 6

The compounds to be tested are made up as 0.01% and 0.001% solutions in 65% actone-35% water. Three inch pots containing a nasturtium plant two inches tall and infested two days before are selected for testing. The pots are placed on a turntable maintained at four revolutions per minute and sprayed for two revolutions with a De Vilbiss Atomizer at 20 pounds per square inch air pressure. The spray tip is held about six inches from the plants and the spray is directed so as to give complete coverage of the aphids and the plants. The sprayed plants are laid on their side on white enamel trays (9½" x 13¼" x ¾") which have had their edges coated with #50 S.A.E. oil as a barrier. Mortality estimates are made after holding for two days at 70° F. and 50% relative humidity. The results are shown in Table I below.

TABLE I.—APHID KILL (PERCENT)

| Compound | Concentration | |
| --- | --- | --- |
|  | .01% | .001% |
| O,O-diethyl S-(1,2-dibromo)-1-propenyl phosphorodithioate. |  | 100 |
| O,O-dimethyl S-1,2-dibromoethyl phosphorodithioate. | 100 | 8 |

EXAMPLE 7

Compounnds to be tested are made up as 0.1% solutions as in Example 6 above. Sieva lima bean leaves are dipped in the test solution and dried. When dry, they are placed in four-inch Petri dishes which have a moist filter paper in the bottom, and ten third-instar armyworm larvae about ⅜" long are added to each dish. The dishes are covered and held at 80° F. and 60% relative humidity. After two days, mortality counts and estimates of the amount of feeding are made. Compounds showing kills greater than 50% are further tested at ten-fold dilutions in 65% acetone-35% water. The results are tabularized in Table II below.

TABLE II.—PERCENT KILL, ARMYWORM

| Compound | Concentration, 0.1% |
| --- | --- |
| O,O-diethyl S-(1,2-dibromo)-1-propenyl phosphorodithioate. | 90 |
| O,O-dimethyl S-1,2-dibromoethyl phosphorodithioate. | 100 |

EXAMPLE 8

Compounds to be tested are made up as 0.1% and 0.01% solutions in 65% acetone-35% water. Sieva lima bean plants with the first pair of leaves three to four inches in size are infested about five hours before testing, using about 100 to 200 mites per leaf. The infested leaves are dipped in the test solutions (in four-inch crystallizing dishes) for three seconds, and the plants are then set in the hood to dry. The treated plants are held for two days at 80° F. and 60% relative humidity, and the adult mite mortality is calculated by counting dead and alive adults on one leaf under the 10× binocularscope. The other leaf is held an additional five days and is then examined at 10× power to estimate the kill of eggs and newly hatched nymphs, giving a measure of ovocidal and residual action, respectively. The results are as follows:

TABLE III.—PERCENT KILL, MITES

| Compound | Concentration | |
| --- | --- | --- |
|  | 0.1% | .01% |
| O,O-diethyl S-(1,2-dibromo)-1-propenyl phosphorodithioate. | 100 | 86 |
| O,O-dimethyl S-1,2-dibromoethyl phosphorodithioate. | 100 | 100 |

Advantageously, the compounds of the present invention may be used as sprays in water or organic solvents, as emulsions in water in other non-solvents, or on solid articles, such as talc, clays and diatomaceous earth. The inert carrier employed generally comprises from about 99.9% to about 95% of the active pesticidal compound incorporated therein.

I claim:

1. The S-alkenyl phosphorodithioate represented by the formula:

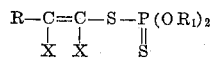

where X is a halogen atom selected from the group consisting of chlorine and bromine, R is selected from the class consisting of hydrogen, lower alkyl, phenyl and naphthyl, and $R_1$ is lower alkyl.

2. The compound: O,O-diethyl S-(1,2-dibromo)-1-propenyl phosphorodithioate.

3. The compound: O,O-diethyl S-(1,2-dichloro)-1-propenyl phosphorodithioate.

4. A process for the preparation of an S-alkenyl phosphorodithioate represented by the formula:

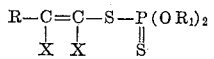

where X is a halogen atom selected from the class consisting of chlorine and bromine, R is selected from the group consisting of hydrogen, lower alkyl, phenyl and naphthyl, and $R_1$ is lower alkyl, which comprises the steps of: bringing into reactive combination substantially equimolar amounts of a halogenating agent and an S-acetylenic phosphorodithioate represented by the formula:

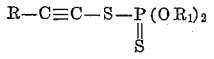

where R and $R_1$ are as above defined, and thereafter recovering a S-alkenyl phosphorodithioate, said halogenating agent being selected from the class consisting of chlorine and bromine.

5. The process of claim 4, wherein the halogen is bromine and the phosphorodithioate is O,O-diethyl-S-1-propynyl phosphorodithioate.

6. The process according to claim 4, in which the halogen is bromine and the phosphorodithioate is O,O-dimethyl S-1-propynyl phosphorodithioate.

References Cited in the file of this patent

UNITED STATES PATENTS

| 2,611,728 | Bartlett et al. | Sept. 23, 1952 |
| 2,767,206 | Whetstone et al. | Oct. 16, 1956 |
| 2,947,773 | Allen | Aug. 2, 1960 |
| 3,027,296 | Whetstone et al. | Mar. 27, 1962 |

FOREIGN PATENTS

| 784,986 | Great Britain | Oct. 23, 1957 |